US011952886B2

(12) United States Patent
Hall et al.

(10) Patent No.: US 11,952,886 B2
(45) Date of Patent: *Apr. 9, 2024

(54) METHOD AND SYSTEM FOR MONITORING SAND PRODUCTION THROUGH ACOUSTIC WIRELESS SENSOR NETWORK

(71) Applicant: ExxonMobil Technology and Engineering Company, Spring, TX (US)

(72) Inventors: Timothy J. Hall, Pinehurst, TX (US); Xiaohua Yi, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 355 days.

This patent is subject to a terminal disclaimer.

(21) Appl. No.: 16/702,810

(22) Filed: Dec. 4, 2019

(65) Prior Publication Data

US 2020/0200001 A1 Jun. 25, 2020

Related U.S. Application Data

(60) Provisional application No. 62/782,160, filed on Dec. 19, 2018.

(51) Int. Cl.
*E21B 47/107* (2012.01)
*E21B 47/16* (2006.01)
(Continued)

(52) U.S. Cl.
CPC ............ *E21B 47/107* (2020.05); *E21B 47/16* (2013.01); *G01V 1/42* (2013.01); *G01V 1/50* (2013.01);
(Continued)

(58) Field of Classification Search
CPC .......... E21B 47/12; E21B 47/14; E21B 47/16; E21B 47/107; G01V 1/42; G01V 1/50;
(Continued)

(56) References Cited

U.S. PATENT DOCUMENTS

| 3,103,643 A | 9/1963 | Kalbfell | 340/17 |
| 3,205,477 A | 9/1965 | Kalbfell | 340/18 |

(Continued)

FOREIGN PATENT DOCUMENTS

| CN | 102733799 | 6/2014 | ............ E21B 47/16 |
| EP | 0636763 | 2/1995 | ............ E21B 47/12 |

(Continued)

OTHER PUBLICATIONS

U.S. Appl. No. 15/666,334, filed Aug. 1, 2017, Walker, Katie M. et al.

(Continued)

*Primary Examiner* — Franklin D Balseca
(74) *Attorney, Agent, or Firm* — ExxonMobil Technology and Engineering Company—Law Department

(57) ABSTRACT

A method and system are described for communicating within a system, which includes a plurality of communication nodes disposed along tubular members in a wellbore. The method includes constructing a communication network and installing the communication nodes along the tubular members. The communication nodes are used to monitor for the presence and/or quantity of sand in the tubular members by analyzing how the contents of the tubular members acoustically affect the signals transmitted between the communication nodes.

15 Claims, 3 Drawing Sheets

(51) Int. Cl.
  *G01V 1/42* (2006.01)
  *G01V 1/50* (2006.01)
  *H04L 67/12* (2022.01)
  *H04W 4/38* (2018.01)

(52) U.S. Cl.
  CPC .............. *H04L 67/12* (2013.01); *H04W 4/38* (2018.02); *G01V 2210/1234* (2013.01)

(58) Field of Classification Search
  CPC .. G01V 2210/1234; H04W 4/38; H04L 67/12
  See application file for complete search history.

(56) References Cited

U.S. PATENT DOCUMENTS

| | | | |
|---|---|---|---|
| 3,512,407 A | 5/1970 | Zill | 73/152 |
| 3,637,010 A | 1/1972 | Maly et al. | 166/51 |
| 3,741,301 A | 6/1973 | Maly et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Petersen et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,058,260 A * | 5/2000 | Brockel | H04W 84/042 703/4 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,745,012 B1 | 6/2004 | Ton et al. | |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Bokhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,353,869 B2 * | 4/2008 | Wetzel | E21B 47/10 166/250.07 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 367/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 73/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |

(56) References Cited

U.S. PATENT DOCUMENTS

| | | | |
|---|---|---|---|
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,657,564 B2 | 5/2017 | Stolpman | E21B 47/16 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu et al. | G08B 21/20 |
| 9,759,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/12 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 10,288,758 B2 * | 5/2019 | Chang | G01V 1/053 |
| 10,690,794 B2 * | 6/2020 | Song | G01V 1/46 |
| 10,771,326 B2 * | 9/2020 | Zhang | E21B 47/14 |
| 11,035,219 B2 * | 6/2021 | Orban | E21B 44/00 |
| 11,293,280 B2 * | 4/2022 | Yi | E21B 47/14 |
| 11,422,280 B2 * | 8/2022 | Shetty | G01V 11/00 |
| 2002/0180613 A1 | 12/2002 | Shi et al. | E21B 47/18 |
| 2002/0196743 A1 | 12/2002 | Sebastian et al. | |
| 2003/0056953 A1 | 3/2003 | Tumlin et al. | 166/298 |
| 2003/0067940 A1 | 4/2003 | Edholm | |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris et al. | 166/255.2 |
| 2005/0284659 A1 | 12/2005 | Hall et al. | 175/27 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2006/0187755 A1 | 8/2006 | Tingley | |
| 2007/0139217 A1 | 6/2007 | Beique et al. | 340/856.3 |
| 2007/0146351 A1 | 6/2007 | Katsuhara et al. | 345/179 |
| 2007/0156359 A1 | 7/2007 | Varsamis et al. | 702/69 |
| 2007/0219758 A1 | 9/2007 | Bloomfield | 702/190 |
| 2007/0272411 A1 | 11/2007 | Lopez de Cardenas et al. | 166/305.1 |
| 2008/0030365 A1 | 2/2008 | Fripp et al. | |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0013663 A1 | 1/2010 | Cavender et al. | 340/854.3 |
| 2010/0089141 A1 | 4/2010 | Rioufol et al. | 73/152.28 |
| 2010/0112631 A1 | 5/2010 | Hur et al. | 435/39 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0192823 A1 | 8/2013 | Barrilleaux et al. | 166/250.01 |
| 2013/0278432 A1 | 10/2013 | Shashoua et al. | 340/853.7 |
| 2013/0319102 A1 | 12/2013 | Riggenberg et al. | 73/152.28 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | Van Zelm | 340/854.3 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |

(56) References Cited

U.S. PATENT DOCUMENTS

| | | |
|---|---|---|
| 2015/0159481 A1 | 6/2015 | Mebarkia et al. .... E21B 47/065 |
| 2015/0167425 A1 | 6/2015 | Hammer et al. ........ E21B 34/06 |
| 2015/0176370 A1 | 6/2015 | Greening et al. ....... E21B 41/00 |
| 2015/0292319 A1 | 10/2015 | Disko et al. ............ E21B 47/16 |
| 2015/0292320 A1 | 10/2015 | Lynk et al. ............. E21B 47/16 |
| 2015/0300159 A1 | 10/2015 | Stiles et al. ............ E21B 47/16 |
| 2015/0330200 A1 | 11/2015 | Richard et al. ........ E21B 44/00 |
| 2015/0337642 A1 | 11/2015 | Spacek .................. E21B 44/005 |
| 2015/0354351 A1 | 12/2015 | Morrow et al. ........ E21B 47/16 |
| 2015/0377016 A1 | 12/2015 | Ahmad ................. E21B 47/122 |
| 2016/0010446 A1 | 1/2016 | Logan et al. ......... E21B 47/122 |
| 2016/0047230 A1 | 2/2016 | Livescu et al. ........ E21B 47/10 |
| 2016/0047233 A1 | 2/2016 | Butner et al. .......... E21B 47/122 |
| 2016/0076363 A1 | 3/2016 | Morrow et al. ........ E21B 47/12 |
| 2016/0109606 A1 | 4/2016 | Market et al. ........... G01V 1/50 |
| 2016/0215612 A1 | 7/2016 | Morrow ................ E21B 47/122 |
| 2017/0138185 A1 | 5/2017 | Saed et al. ............. E21B 47/14 |
| 2017/0145811 A1 | 5/2017 | Robison et al. .... E21B 47/0007 |
| 2017/0152741 A1 | 6/2017 | Park et al. ............ E21B 47/123 |
| 2017/0167249 A1 | 6/2017 | Lee et al. ................ E21B 47/14 |
| 2017/0204719 A1 | 7/2017 | Babakhani .......... E21B 47/0005 |
| 2017/0254183 A1 | 9/2017 | Vasques et al. ........ E21B 47/16 |
| 2017/0293044 A1 | 10/2017 | Gilstrap et al. .......... G01V 1/50 |
| 2017/0314386 A1 | 11/2017 | Orban et al. .......... E21B 47/091 |
| 2018/0010449 A1 | 1/2018 | Roberson et al. ...... E21B 47/16 |
| 2018/0058191 A1 | 3/2018 | Romer et al. ....... E21B 47/0007 |
| 2018/0058198 A1 | 3/2018 | Ertas et al. ............. E21B 47/12 |
| 2018/0058202 A1* | 3/2018 | Disko .................... E21B 47/12 |
| 2018/0058203 A1 | 3/2018 | Clawson et al. ........ E21B 47/14 |
| 2018/0058204 A1 | 3/2018 | Clawson et al. ........ E21B 47/14 |
| 2018/0058206 A1 | 3/2018 | Clawson et al. ........ E21B 47/14 |
| 2018/0058207 A1 | 3/2018 | Song et al. ............. E21B 47/16 |
| 2018/0058208 A1 | 3/2018 | Song et al. ............. E21B 47/16 |
| 2018/0058209 A1 | 3/2018 | Song et al. ............. E21B 47/16 |
| 2018/0066490 A1 | 3/2018 | Kjos .................... E21B 33/035 |
| 2018/0066510 A1 | 3/2018 | Walker et al. ........ E21B 47/011 |
| 2019/0112913 A1 | 4/2019 | Song et al. ............. E21B 47/01 |
| 2019/0112915 A1 | 4/2019 | Disko et al. ............ E21B 47/14 |
| 2019/0112916 A1 | 4/2019 | Song et al. ............. E21B 47/14 |
| 2019/0112917 A1 | 4/2019 | Disko et al. ............ E21B 47/14 |
| 2019/0112918 A1 | 4/2019 | Yi et al. .................. E21B 4/16 |
| 2019/0112919 A1 | 4/2019 | Song et al. ............. E21B 47/16 |
| 2019/0116085 A1 | 4/2019 | Zhang et al. ........... H04L 12/24 |
| 2019/0153849 A1* | 5/2019 | Kent ...................... E21B 47/18 |
| 2019/0153857 A1 | 5/2019 | Yi et al. |
| 2019/0153858 A1 | 5/2019 | Kinn et al. |
| 2019/0154859 A1 | 5/2019 | Song et al. |
| 2019/0203574 A1 | 7/2019 | Yi et al. |
| 2019/0203591 A1 | 7/2019 | Disko et al. |
| 2019/0242249 A1 | 8/2019 | Walker et al. |
| 2019/0249548 A1 | 8/2019 | Zhang et al. |
| 2020/0200003 A1* | 6/2020 | Yi ........................... E21B 47/14 |
| 2021/0396131 A1* | 12/2021 | Rogacheva ............ E21B 47/12 |

FOREIGN PATENT DOCUMENTS

| | | | |
|---|---|---|---|
| EP | 1409839 | 4/2005 | .......... E21B 43/1185 |
| EP | 2677698 | 12/2013 | ............. H04L 12/28 |
| WO | WO2001/033391 | 1/2001 | |
| WO | WO2002/027139 | 4/2002 | ............. E21B 43/12 |
| WO | WO2004/033852 | 4/2004 | |
| WO | WO-2005059307 A1 * | 6/2005 | ............. E21B 47/10 |
| WO | WO2010/074766 | 7/2010 | ................ A41C 1/14 |
| WO | WO2013/079928 | 6/2013 | ............. E21B 47/12 |
| WO | WO2013/162506 | 10/2013 | |
| WO | WO2014/018010 | 1/2014 | ............. E21B 47/12 |
| WO | WO2014/049360 | 4/2014 | ............. E21B 47/12 |
| WO | WO2014/100271 | 6/2014 | ............. E21B 47/12 |
| WO | WO2014/134741 | 9/2014 | ............. E21B 47/13 |
| WO | WO2015/117060 | 8/2015 | ............. E21B 47/12 |

OTHER PUBLICATIONS

U.S. Appl. No. 62/782,153, filed Dec. 19, 2019, Yi, Xiaohua et al.

U.S. Appl. No. 62/782,160, filed Dec. 19, 2018, Hall, Timothy J. et al.

Arroyo, Javier et al. (2009) "Forecasting Histogram Time Series with K-Nearest Neighbours Methods," *International Journal of Forecasting*, v.25, pp. 192-207.

Arroyo, Javier et al. (2011) "Smoothing Methods for Histogram-Valued Time Seriers: an Application to Value-at-Risk," *Univ. of California, Dept. of Economics*, www.wileyonlinelibrary.com, Mar. 8, 2011, 28 pages.

Arroyo, Javier et al. (2011) "Forecasting with Interval and Histogram Data Some Financial Applications," *Univ. of California, Dept. of Economics*, 46 pages.

Emerson Process Management (2011), "Roxar downhole Wireless PT sensor system," ww.roxar.com, or downhole@roxar.com, 2 pgs.

Gonzalez-Rivera, Gloria et al. (2012) "Time Series Modeling of Histogram-Valued Data: the Daily Histogram Time Series of S&P500 Intradaily Returns," *International Journal of Forecasting*, v.28, 36 pgs.

Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.

Qu, X. et al. (2011) "Reconstruction fo Self-Sparse 20 NMR Spectra From undersampled Data in the Indirect Dimension", pp. 8888-8909.

U.S. Department of Defense (1999) "Interoperability and Performance Standards for Medium and High Frequency Radio Systems," *MIL-STD-188-141B*, Mar. 1, 1999, 584 pages.

\* cited by examiner

METHOD AND SYSTEM FOR MONITORING SAND PRODUCTION THROUGH ACOUSTIC WIRELESS SENSOR NETWORK

CROSS REFERENCE TO RELATED APPLICATIONS

This application claims the priority benefit of United States Provisional Patent Application No. 62/782,160, filed Dec. 19, 2018, entitled METHOD AND SYSTEM FOR MONITORING SAND PRODUCTION THROUGH ACOUSTIC WIRELESS SENSOR NETWORK.

This application is related to U.S. Provisional Application Ser. No. 62/428,367, filed Nov. 30, 2016, "Dual Transducer Communications Node for Downhole Acoustic Wireless Networks and Method Employing Same;" U.S. patent application Ser. No. 15/666,292, filed Aug. 1, 2017, "Dual Transducer Communications Node For Downhole Acoustic Wireless Networks and Method Employing Same;" U.S. Provisional Application Ser. No. 62/381,330, filed Aug. 30, 2016 "Communication Networks, Relay Nodes for Communication Networks, and Methods of Transmitting Data Among a Plurality of Relay Nodes;" U.S. patent application Ser. No. 15/665,931, filed Aug. 1, 2017, "Communication Networks, Relay Nodes for Communication Networks, and Methods of Transmitting Data Among a Plurality of Relay Nodes;" U.S. Provisional Application Ser. No. 62/428,374, filed Nov. 30, 2016, "Hybrid Downhole Acoustic Wireless Network;" U.S. Provisional Application Ser. No. 62/428,385, filed Nov. 30, 2016, "Methods of Acoustically Communicating And Wells That Utilize The Methods;" U.S. Provisional Application Ser. No. 62/433,491, filed Dec. 13, 2016, "Methods of Acoustically Communicating And Wells That Utilize The Methods;" U.S. Provisional Application Ser. No. 62/428,394, filed Nov. 30, 2016, "Downhole Multiphase Flow Sensing Methods;" U.S. Provisional Application Ser. No. 62/428,425, filed Nov. 30, 2016, titled "Acoustic Housing for Tubulars;" U.S. patent application Ser. No. 16/139,414, filed Sep. 24, 2018, "Method And System For Performing Operations Using Communications;" U.S. patent application Ser. No. 16/139,394, filed Sep. 24, 2018, "Method And System For Performing Communications Using Aliasing;" U.S. patent application Ser. No. 16/139,427, filed Sep. 28, 2018, "Method And System For Performing Operations With Communications;" U.S. patent application Ser. No. 16/139,421, filed Sep. 24, 2018, "Method And System For Performing Wireless Communications Along A Drilling String;" U.S. patent application Ser. No. 16/139,384, filed Sep. 24, 2018, "Method And System For Performing Hydrocarbon Operations With Mixed Communication Networks;" U.S. patent application Ser. No. 16/139,373, filed Sep. 24, 2018, "Vertical Seismic Profiling;" U.S. patent application Ser. No. 16/175,441, filed Oct. 30, 2018, "Method and System for Performing Operations using Communications for a Hydrocarbon System;" U.S. patent application Ser. No. 16/175,467, filed Oct. 30, 2018, "Method and System for Performing Wireless Ultrasonic Communications Along Tubular Members;" and U.S. patent application Ser. No. 16/175,488, filed Oct. 30, 2018, "Method and System for Performing Hydrocarbon Operations Using Communications Associated with Completions," the disclosures of which are incorporated herein by reference in their entireties.

This application is related to U. S. Provisional Application 2018EM443, "Method and System for Monitoring Post-Stimulation Operations through Acoustic Wireless Sensor Network," having common inventors and assignee and filed on an even date herewith, the disclosure of which is incorporated herein by reference in its entirety.

FIELD OF THE INVENTION

This disclosure relates generally to the field of performing hydrocarbon-related operations, such as hydrocarbon exploration, hydrocarbon development, and hydrocarbon production. Specifically, the disclosure relates to methods and systems for communicating with communication nodes, which may include being disposing along one or more tubular members, such as along casing or tubing within a wellbore, and used to monitor sand production and other associated operations.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In hydrocarbon operations, wellbores are drilled to provide access to subsurface fluids, the produced fluids may include sand or other solids along with the hydrocarbons and/or water. Further, the wellbore may be unstable and/or may not be structurally sound as a result of the subsurface formation conditions along changes in the hydrocarbon operations. Such changes in the subsurface formation and/or associated conditions may result in production of debris, such as sand, solids and/or formation material, which has multiple adverse effects on hydrocarbon operations. Sand and/or solids production may increase significantly during the first flow and/or water breakthrough or even when conditions change. Unfortunately, the sand or solid production may reduce well productivity, may damage completion devices, may hinder wellbore access and/or may increase solid disposal. There are multiple completion options to limit sand production, such as gravel packing, resin injection, cementing the formation, and the like, but it is still important to monitor the sand production for better well bore management, clean-up scheduling, etc.

In hydrocarbon exploration, hydrocarbon development, and/or hydrocarbon production operations, several real time data systems or methods have been proposed. As a first example, a physical connection, such as a cable, an electrical conductor or a fiber optic cable, is secured to a tubular member, which may be used to evaluate conditions, such as subsurface conditions. The cable may be secured to an inner portion of the tubular member or an outer portion of the tubular member. The cable provides a hard wire connection to provide real-time transmission of data. Further, the cables may be used to provide high data transmission rates and the delivery of electrical power directly to downhole sensors. However, use of physical cables may be difficult as the cables have to be unspooled and attached to the tubular member sections disposed within a wellbore. Accordingly, the conduits being installed into the well may not be rotated because of the attached cables, which may be broken through such installations. This limitation may be problematic for installations into horizontal wells, which typically involve rotating the tubular members. These passages for the cables provide potential locations for leakage of fluids, which may be more problematic for configurations that involve high pressures fluids. In addition, the leakage of down-hole fluids may increase the risk of cement seal failures.

In contrast to physical connection configurations, various wireless technologies may be used for downhole communications. Such technologies are referred to as telemetry. These communication nodes communicate with each other to manage the exchange of data within the wellbore and with a computer system that is used to manage the hydrocarbon operations. The communication nodes may involve different wireless network types. As a first example, radio transmissions may be used for wellbore communications. However, the use of radio transmissions may be impractical or unavailable in certain environments or during certain operations. Acoustic telemetry uses an acoustic wireless network to wirelessly transmit an acoustic signal, such as a vibration, via a tone transmission medium. In general, a given tone transmission medium may only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length thereof. However, conventional data transmission mechanisms may not be effectively used and may not be used with certain hydrocarbon operations.

Accordingly, there remains a need in the industry for methods and systems that are more efficient and may lessen problems associated with noisy and ineffective communication. Further, a need remains for efficient approaches to perform real-time or concurrent monitoring of sand production for better wellbore management, clean-up scheduling, or other activities, where the monitoring involves acoustic communicating along tubular members within a wellbore. The present techniques provide methods and systems that overcome one or more of the deficiencies discussed above.

SUMMARY

A method of detecting sand in a wellbore is disclosed according to disclosed aspects. Well data is obtained for a subsurface region. A communication network is determined based on the obtained well data. The communication network includes a plurality of communication nodes. The plurality of communication nodes are installed into a wellbore. One or more communication nodes of the plurality of communication nodes obtain measurements associated with fluids within the wellbore and transmit the measurement data to other communication nodes in the communication network. Sand detection operations are performed in the wellbore. The sand detection operations include: transmitting a signal from a first of the plurality of communication nodes; receiving the signal by a second of the plurality of communication nodes; analyzing the received signal to determine whether sand is present in the wellbore; and transmitting data packets associated with the received signal to a control unit via the communication network. Hydrocarbon operations are performed in the wellbore.

A hydrocarbon system is disclosed according to disclosed aspects. A plurality of tubular members disposed in a wellbore in a hydrocarbon system. A communication network is associated with the hydrocarbon system. The communication network comprises a plurality of communication nodes that are configured to communicate operational data between two or more of the plurality of communication nodes during operations. A sand detection system includes one or more communication nodes of the plurality of communication nodes configured to receive acoustic signals sent from others of the plurality of communication nodes. The acoustic signals are analyzed to determine the presence of sand in a portion of the plurality of tubular members through which the acoustic signals were transmitted.

BRIEF DESCRIPTION OF THE DRAWINGS

The advantages of the present invention are better understood by referring to the following detailed description and the attached drawings.

DETAILED DESCRIPTION

Figure 1:
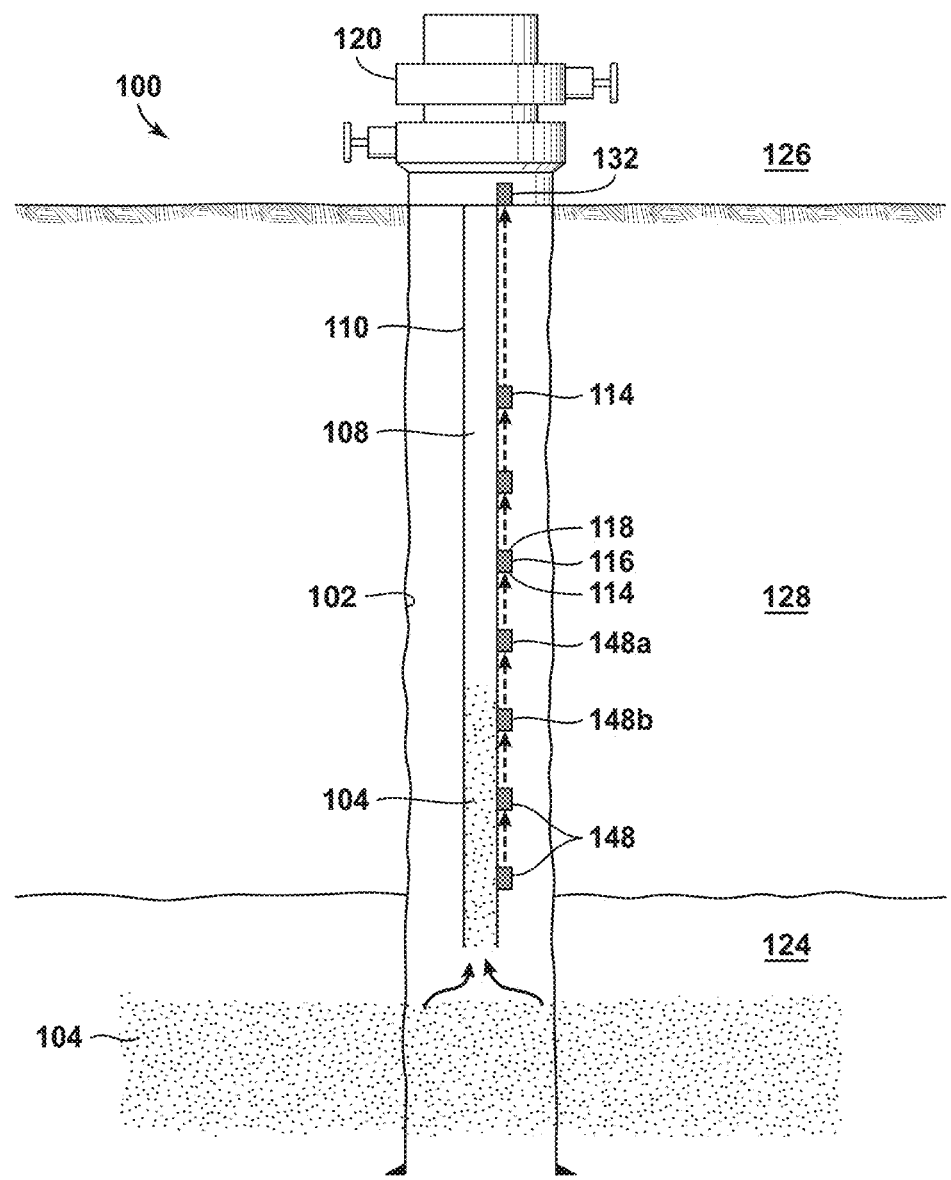
FIG. 1 is an exemplary schematic representation of a well configured to use a communication network that includes one or more communication nodes in accordance with certain aspects of the present techniques.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

The directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

As used herein, the term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "any" means one, some, or all indiscriminately of whatever quantity.

As used herein, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "based on" does not mean "based only on", unless expressly specified otherwise. In other words, the phrase "based on" describes both "based only on," "based at least on," and "based at least in part on."

As used herein, "clock tick" refers to a fundamental unit of time in a digital processor. For example, one clock tick equals the inverse of the effective clock speed that governs operation of the processor. Specifically, one clock tick for a 1 MHz effective clock speed is equal to one microsecond. As another example, one clock tick may be equivalent to the minimum amount of time involved for a scalar processor to execute one instruction. A processor may operate at various effective clock speeds, and, as such, the amount of time equivalent to one clock tick may vary, but a fractional clock tick is not possible.

As used herein, "conduit" refers to a tubular member forming a physical channel through which something is conveyed. The conduit may include one or more of a pipe, a manifold, a tube or the like, or the liquid contained in the tubular member. Alternately, conduit refers to an acoustic channel of liquid which may, for example, exist between the formation and a tubular.

As used herein, "couple" refers to an interaction between elements and is not meant to limit the interaction to direct interaction between the elements and may also include indirect interaction between the elements described. Couple may include other terms, such as "connect", "engage", "attach", or any other suitable terms.

As used herein, "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

As used herein, "exemplary" is used exclusively herein to mean "serving as an example, instance, or illustration." Any embodiment described herein as "exemplary" is not necessarily to be construed as preferred or advantageous over other embodiments.

As used herein, "formation" refers to any definable subsurface region. The formation may contain one or more hydrocarbon-containing layers, one or more non-hydrocarbon containing layers, an overburden, and/or an underburden of any geologic formation.

As used herein, "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like. The hydrocarbon exploration activities may include drilling exploratory wells.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be used and techniques to be used in extracting the hydrocarbons from the subsurface formation, and the like.

As used herein, "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° Celsius (C.) and 1 atmospheric (atm) pressure). Hydrocarbon fluids may include, for example, oil, natural gas, gas condensates, coal bed methane, shale oil, shale gas, and other hydrocarbons that are in a gaseous or liquid state.

As used herein, "hydrocarbon operations" refers to any activity associated with hydrocarbon exploration, hydrocarbon development, collection of wellbore data, and/or hydrocarbon production. It may also include the midstream pipelines and storage tanks, or the downstream refinery and distribution operations. By way of example, the hydrocarbon operations may include managing the communications for the wellbore through the communication nodes by using the tubular members, such as drilling string and/or casing.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments.

As used herein, "mode" refers to a setting or configuration associated with the operation of communication nodes in a communication network. For example, the mode may include a setting for acoustical compression wave, acoustical shear wave, or any combination thereof.

As used herein, "monitored section" and "monitored sections" refer to locations along the tubular members that include sensors and/or are regions of interest.

As used herein, "unmonitored section" and "unmonitored sections" refer to locations along the tubular members that do not include sensors and/or are not regions of interest.

As used herein, "operatively connected" and/or "operatively coupled" means directly or indirectly connected for transmitting or conducting information, force, energy, or matter.

As used herein, "optimal", "optimizing", "optimize", "optimality", "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

As used herein, "potting" refers to the encapsulation of electrical components with epoxy, elastomeric, silicone, or asphaltic or similar compounds for the purpose of excluding moisture or vapors. Potted components may or may not be hermetically sealed.

As used herein, "range" or "ranges", such as concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, "stream" refers to fluid (e.g., solids, liquid and/or gas) being conducted through various regions, such as equipment and/or a formation. The equipment may include conduits, vessels, manifolds, units or other suitable devices.

As used herein, "subsurface" refers to geologic strata occurring below the earth's surface.

As used herein, "telemetry diagnostic data", "diagnostic telemetry data", or "telemetry data" refer to data associated with the communication nodes exchanging information. The telemetry data may be exchanged for the purpose of assessing and proving or otherwise optimizing the communication. By example, this may include frequency and/or amplitude information.

As used herein, "physical layer" refers to the lowest layer of the Open Systems Interconnection model (OSI model) maintained by the identification ISO/IEC 7498-1. The OSI model is a conceptual model that partitions a communication system into abstraction layers. The physical layer defines basic electrical and physical specifications of the network such as acoustic frequency band, radio-frequency (RF) frequency band, acoustic versus electromagnetic communication, and other electrical and physical aspects of the communication.

As used herein, "direct mapping" refers to establishing a correspondence between communication frequencies and symbolic information such that particular communication frequencies represent a particular piece of symbolic information. Examples of symbolic information include, but are not limited to, the letters in alphabet or specific arrangements of bits in a computer memory. By way of example, direct mapping in an acoustic telemetry system may include each 100 kHz tone representing the letter "A", each 102 kHz tone representing the letter "B", each 104 kHz tone representing the letter "C", and so on. By contrast, "spread spectrum" may involve a correspondence between communication frequencies and symbolic information that changes repeatedly and in rapid fashion, such that, by way of example, a 100 kHz tone may represent the letter "A" and a 104 kHz tone may represent the letter "B" and a 102 kHz tone may represent the letter "C", then a 110 kHz tone may represent the letter "A" and a 112 kHz tone may represent the letter "B" and a 114 kHz tone may represent the letter "C", then a 90 kHz tone may represent the letter "A" and a 84 kHz tone may represent the letter "B" and a 96 kHz tone may represent the letter "C", and so on. In addition, the direct mapping may not change, while spread spectrum may change.

As used herein, "frequency combining" refers to aggregating similar frequencies by dividing the range of possible frequencies into a number of sections and classifying all frequencies within any one section as occurrences of a single frequency. It will be apparent to a person skilled in the computational arts that the totality of possible frequencies may be excessively large, leading to an excessive degree of computational complexity inherent in analysis of the frequencies, and that frequency combining can limit the number of possibilities to reduce the computational complexity inherent in analysis of the possibilities to an acceptable level. The limited number of possibilities resulting from frequency combining may be referred to as the "combined frequencies". The cadence of digital clock ticks acts as an upper bound on the number of possible combined frequencies in all cases.

As used herein, "sand" refers to sedimentary rock, sands, silicilytes, clays, carbonates, and other media that may be co-produced with heavy hydrocarbons, such as heavy hydrocarbons co-produced with sand as a slurry.

As used herein, "signal strength" refers to a quantitative assessment of the suitability of a characteristic for a particular purpose. A characteristic may be an amplitude, a Fast Fourier Transform (FFT) magnitude, a signal-to-noise ratio (SNR), a zero crossing (ZCX) quality, a histogram quantity, an occurrence count, a margin or proportion above a baseline, or any other suitable measurement or calculation. By way of example, a histogram representing ZCX occurrence counts by period may assess ZCX signal strength for each period by dividing the occurrence count for each period by the maximum occurrence count in the histogram such that the ZCX signal strength for the period having the maximum occurrence count is 1 and this is the highest ZCX signal strength among all the periods in the histogram.

As used herein, "tubular member", "tubular section" or "tubular body" refer to any pipe, such as a joint of casing, a portion of a liner, a drill string, a production tubing, an injection tubing, a pup joint, a buried pipeline, underwater piping, or above-ground piping. Solid lines therein, and any suitable number of such structures and/or features may be omitted from a given embodiment without departing from the scope of the present disclosure.

As used herein, "wellbore" or "downhole" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

As used herein, "well data" may include seismic data, electromagnetic data, resistivity data, gravity data, well log data, core sample data, and combinations thereof. The well data may be obtained from memory or from the equipment in the wellbore. The well data may also include the data associated with the equipment installed within the wellbore and the configuration of the wellbore equipment. For example, the well data may include the composition of the tubular members, thickness of the tubular members, length of the tubular members, fluid composition within the wellbore, formation properties, cementation within the wellbore and/or other suitable properties associated with the wellbore.

As used herein, "zone", "region", "container", or "compartment" is a defined space, area, or volume contained in the framework or model, which may be bounded by one or more objects or a polygon encompassing an area or volume of interest. The volume may include similar properties.

The exchange of information may be used to manage the operations for different technologies. By way of example, the communication network may include communication nodes disposed along one or more tubular members. The communication nodes may be distributed along casing or tubing within a wellbore, along a subsea conduit and/or along a pipeline, to enhance associated operations. To exchange information, the communication network may include physically connected communication nodes, wirelessly connected communication nodes or a combination of physically connected communication nodes and wirelessly connected communication nodes.

By way of example, the communication network may be used for data exchanges of operational data, which may be used for real-time or concurrent operations involving hydrocarbon exploration operations, hydrocarbon development operations, and/or hydrocarbon production operations, for example. In hydrocarbon operations, the system or method may involve communicating via a downhole network including various communication nodes spaced-apart along a length of tubular members, which may be a tone transmission medium (e.g., conduits). In addition, certain communication nodes, which are disposed near specific tools or near certain regions, may include one or more sensors. The communication nodes may communicate with each other to manage the exchange of data within the wellbore and with a computer system that is used to manage the hydrocarbon operations. By way of example, the communication network may involve transmitting and/or receiving signals or tones via one or more frequencies of acoustic tones in the form of data packets via the tone transmission medium. The downhole wireless communication through the tubular members, such as casing and/or production tubing, may be beneficial for enhancing hydrocarbon operations. In such communications, the communication network may include communication nodes that include one or more sensors or sensing components to use ultrasonic acoustic frequencies to exchange information, which may simultaneously or concurrently performed with other operations.

In certain configurations, the communication nodes may include a housing that isolates various components from the wellbore environment. In particular, the communication nodes may include one or more encoding components, which may be configured to generate and/or to induce one or more acoustic tones within tone transmission medium, such as a tubular member or liquid inside the tubular member. Alternately, conduit refers to an acoustic channel of liquid which may, for example, exist between the formation and a tubular member. In addition, the communication nodes may include one or more decoding components, which may be configured to receive and/or to decode acoustic tones from the tone transmission medium. The communication nodes may include one or more power supplies configured to supply energy to the other components, such as batteries. The communication nodes may include one or more sensors, which may be configured to obtain measurement data associated with the downhole environment and/or the formation. In particular, the one or more sensors may be used to monitor for the presence of sand during production. The communication nodes may include relatively small transducers to lessen the size of the communication nodes, such that they may be disposed or secured to locations having limited clearance, such as on the surface of tubular members (e.g., internal surface and/or outer surface), and/or between successive layers of downhole tubular members. As an example, small acoustic transducers may be configured to transmit and/or receive tones.

The distribution and locations of the communication nodes may vary based on specific aspects of the wellbore. The distribution of the communication nodes may involve disposing more communication nodes within the monitored sections of the wellbore. This distribution of communication nodes may include disposing two or more communication nodes in a horizontal configuration or a circumferential configuration, such as substantially equidistantly around the outer surface of the tubular member. As a specific example, the communication nodes may include disposing four communication nodes disposed around the outer surface of the tubular members. Further, the distribution of communication nodes may include disposing two or more communication nodes in a vertical configuration or a longitudinal configuration, such as spaced along the surface of the tubular members. As a specific example, the communication nodes may include disposing four communication nodes disposed around the outer surface of the tubular member.

The configuration of the communication nodes into a communication network may include disposing the communication nodes at specific locations based on predicted sand production locations, specific aspects associated with the wellbore and specific aspects associated with the wellbore. The present techniques may involve determining the presence of sand during hydrocarbon production, based on the measurements or notifications from the communication nodes and associated calculations to minimize uncertainty or risk in the sand removal operations. For example, the present techniques may include determining the timing of different steps in sand removal operations.

To manage sand detection, the present techniques may include obtaining measurements, using the measurements and/or providing notifications associated with the presence of sand in a wellbore or a tubular member associated therewith. The communication nodes may provide signals or notifications associated with the properties of fluids within the wellbore. Based on the notifications, the type or composition of materials in the wellbore may be determined.

By way of example, the communication nodes may be configured to monitor the detection of sand in a wellbore. A first communication node may be disposed on a tubular member at a first sensor location within the wellbore that is upstream of the location that sand may be present. A second communication node may be disposed on a tubular member at a second sensor location within the wellbore that is downstream of the first sensor location and upstream of the location that sand may be present.

In certain configurations, the present techniques may include a sand detection system. The communication nodes may include one or more ultrasonic transducers for transmitting and receiving acoustic signals; electronic circuits for signal processing and computation; and/or batteries for power supply. Extra ultrasonic transducers with same or different operating frequencies may be included for sensing purposes. The communication nodes may include one or more sensing components installed on tubular member (e.g., casing and/or tubing, such as a sand screen). The one or more sensing components may form a sensor array for data collection as well as communication. The measured data may be relayed back to topside equipment to a control unit. As sand production may be predictable and therefore the location of sand in the wellbore may be predefined, one or more communication nodes may include dedicated sensors and may be installed along tubular members in the preferred configurations to monitor the presence of sand therein (e.g., distribution of communication nodes with sensors or distribution of a communication node with associated sensors). For other areas of the wellbore where the presence of sand is unlikely (e.g., unmonitored sections), the communication nodes are primarily used for data packet exchanges, which are used to relay the measured data or notifications to a control unit.

In addition to the monitoring for the presence of sand, the system may include one or more communication nodes having one or more sensors in a dense configuration in a wellbore region where the presence of sand is likely. The sensors may be configured to measure pressure, temperature, gamma ray, flow meter, resistivity, capacitance, stress, strain, density, vibration and any combination thereof. The sensors may be within the housing of the communication node or may include individual housings for the sensors and a controller that houses the other components. The distributed sensors may provide localized measurement data about the composition of the contents of the wellbore or an associated tubular member. The data may be combined, integrated and used to generate a 3D map of the monitored region.

In certain configurations, the communication nodes for sand detection operations may be pre-installed on the tubular member prior to production operations. In such a configuration, the sand detection system may be disposed in the wellbore to monitor before, during, and/or after hydrocarbon production activities. The monitoring may include measuring a first property related to sand detection before and during hydrocarbon production and then may include measuring a second property related to sand detection after hydrocarbon production. The measurements may be transmitted to the control unit or a processor in the communication node, which may be configured to compare the measurements for different time periods to determine information about the presence of sand in the wellbore or associated tubular. The comparisons may be used to determine the presence of sand based on the measurement data.

In certain configurations, the sand detection system may include one or more communication nodes, which may include various sensors, configured to exchange data packets with a control unit. The communication nodes may be disposed on an interior surface of the tubular member, an external surface of the tubular member, and/or a combination thereof. In the communication nodes include one or more sensors, the sensors may be distributed in individual housings that communicate with a controller and/or a single housing. The sensors may be disposed on an interior surface of the tubular member, an external surface of the tubular member, and/or a combination thereof. The sensors may be used to acquire measurements associated with the area where sand production is possible. The exchange of data with the control unit from the communication nodes may be performed in real time or after a delay as desired.

The communication nodes may be configured to perform ultrasonic telemetry and sensing in specific frequency bands. As an example, the communication network may use low-frequency ranges and/or high-frequency ranges (e.g., may include low-frequency communication nodes and/or high-frequency communication nodes). The low-frequency communication nodes may be configured to transmit signals and to receive signals that are less than or equal to (≤) 1200 kHz, ≤100 kHz, ≤50 kHz, or ≤20 kHz. In particular, the low-frequency communication nodes may be configured to exchange signals in the range between 100 Hz and 20 kHz; in the range between 1 kHz and 20 kHz; and in the range between 5 kHz and 20 kHz. Other configurations may include low-frequency communication nodes, which may be configured to exchange signals in the range between 100 Hz and 200 kHz; in the range between 100 Hz and 100 kHz; in the range between 1 kHz and 200 kHz; in the range between 1 kHz and 100 kHz; in the range between 5 kHz and 100 kHz and in the range between 5 kHz and 200 kHz. The communication nodes may also include high-frequency communication nodes configured to transmit and receive signals that are greater than (>) 20 kHz, >50 kHz, >100 kHz or >200 kHz. Also, the high-frequency communication nodes may be configured to exchange signals in the range between greater than 20 kHz and 1 MHz, in the range between greater than 20 kHz and 750 kHz, in the range between greater than 20 kHz and 500 kHz. Other configurations may include high-frequency communication nodes, which may be configured to exchange signals in the range between greater than 100 kHz and 1 MHz; in the range between greater than 200 kHz and 1 MHz; in the range between greater than 100 kHz and 750 kHz; in the range between greater than 200 kHz and 750 kHz; in the range between greater than 100 kHz and 500 kHz; and in the range between greater than 200 kHz and 500 kHz.

In addition, the communication nodes may operate with low frequency bands and/or high-frequency bands to enhance operations. The communication nodes may include piezo transducers that may be coupled to the environment to be sensed (e.g., pulse echo from piezo assembly behind a thin steel wall and thus proximate flowing media, hydrates, sand, which may be within the tubular member and/or external to the tubular member). The configurations may include the use of acoustic or other transducer arrays spaced on an azimuth. Such transducer arrays may be used to launch single mode acoustic or vibrational waves that may be tailored for one or more of: (i) long distance telemetry, (ii) focusing the acoustic energy in steel tubular, or within media, or outside of surface of tubular, (iii) for one or more piezoelectric transducers, the termination properties, coupling to adjoining tubular members, and preferable acoustic wave properties that may be enhanced by the radial design versus a point or wide line attachment. The communication nodes may be configured to detect the properties through a wall or surface and/or through exposure to the fluid adjacent to the communication node.

In still yet another configuration, the electronic circuits are present within the communication nodes (e.g., which may include sensors) to process the collected measurement data, store the data for transmission, and conduct necessary on-board computation to simplify data for transmission. Local detection of faulty data, data compression, and automated communication with neighboring sensors may be performed with the on-board electronics, signal processing components and microprocessor. In such a configuration, the communication nodes of the sand detection system may efficiently manage the exchange of measured data, which may be communicated in real time or after a delay as desired.

In another configuration, the communication node may be configured to function as a transmitter and/or receiver for data transmission to the control unit disposed at the topside or other devices within the wellbore. In other configurations, multiple different types of devices may be connected. For example, if it is an acoustic system, piezos may be facilitated as a transmitter and a receiver to relay data back to topside equipment or other communication nodes. If it is an electromagnetic system, then radio-frequency receivers with communication frequency ranges may be integrated.

In other configurations, the communication nodes may be configured to function as a transmitter and/or receiver and/or may be oriented to receive and/or transmit inside the tubular member, outside the tubular member and/or a combination thereof. The range of the communication nodes may be extended by broadcasting directly into the tubular member versus receiving and transmitting on the exterior of the tubular member. In addition, the reliability and quality of the acoustic transmission when broadcasting into the tubular member may be enhanced.

In addition, other configurations may include communications nodes and associated sensors integrated into an array, such as a collar and/or even within joints or tubular members. Such an integration may save time by avoiding an added step of clamping the communication nodes onto the tubular members prior to installation. This integration may include enhancing reliability by eliminating the field installation and potential of improper or poor mating of the communication nodes to the tubular member. The integration may avoid cost and/or the complexity of external communication nodes, which may be necessary for measure of pressure directly in flow zone or annulus. Telemetry electronics and/or hardware along with sensors in an integrated package that may maintain communication node physical integrity, while enhancing accuracy of in-flow zone measurements and/or exterior materials.

In addition to the variations on the configurations, the communication node may include different types of sensors, such as sonic logging components and/or an imaging measurement components. In such configurations, the communication nodes may include additional power supplies, such as batteries, to drive an array of acoustic sources or a single acoustic source to generate sufficient acoustic energy to perform sonic logging or obtaining imaging measurements, where the source may be triggered by a communication node. By way of example, the communication nodes may include one or more sensors that may include a sonic log component. The sonic log component may operate by emitting a large acoustic pulse on the communication node, which is disposed near the sand screen. The sonic logging techniques may include an acoustic wave that may travel along the tubular members and any associated formation, with sufficient energy to be detected by the communication nodes. Using sonic logging interpretation techniques, the measured data may be used to evaluate voids or gaps (e.g., permeability, porosity, lithology, or fluid type in the nearby formation), and/or to evaluate a cementing installation before and after the cementing installation operations. Assessing some of these properties may involve additional data or knowledge of the system (e.g., well data).

To manage the transmission and reception of signals, the processor in the communication node may operate at one or more effective clock speeds. The presence of a clock in a digital system, such as a communication node, results in discrete (not continuous) sampling, and is frequency combining (e.g., any frequency that falls between clock ticks is detected at the higher tick or lower tick (because fractional ticks are not permitted), so in a sense, the frequencies that fall between clock ticks result in combined frequencies. The communication nodes may operate at a high-frequency effective clock speed and/or a low-frequency effective clock speed. The effective clock speed is the clock speed at which the processor operates after inclusion of applicable clock multipliers or clock dividers. As a result, the sampling frequency is equal to the effective clock speed, while the telemetry frequency is the frequency of a given telemetry tone. By way of example, the telemetry frequency may be less than or equal to 200 kHz, less than or equal to 150 kHz, less than or equal to 75 kHz or less than or equal to 50 kHz, or even the range may be between greater than 20 kHz and 1 MHz, in the range between greater than 20 kHz and 750 kHz, in the range between greater than 20 kHz and 500 kHz. The high-frequency effective clock speed may be may be greater than 200 kHz, greater than or equal to 500 kHz, greater than or equal to 1 MHz, greater than or equal to 10 MHz or greater than or equal to 100 MHz.

Downhole communications along the tubular members, such as casing and/or production tubing, may be beneficial for enhancing hydrocarbon operations, such as sand detection and monitoring the production of fluids after sand detection for well management. The present techniques may include various enhancements, such as frequency selection, which may use laboratory and/or surface testing facilities and acoustic waveguide theory. Another enhancement may include frequency optimization, which involves broadcast broadband signals locally between downhole neighboring communication nodes. For the frequency optimization, only the strongest acoustic signals may be selected and may be used for communication between each pair of communication nodes. Also, acoustic signals may be the same or different among different pairs of communication nodes in the system. As yet another enhancement, adaptive coding methods may be selected to support communication based on the selected number of acoustic frequencies. For one example, the communication may be successful when the right coding method is selected if the number of acoustic frequencies is limited (e.g., one frequency). However, the communication data rate may be compromised once the number of acoustic frequencies becomes limited. Further, the set of acoustic frequencies and coding method may also be re-evaluated and updated at various time intervals and/or as acoustic condition changes.

The communication network may include different types of wireless communication nodes that form respective wireless communication networks. The wireless networks may include long-range communication nodes (e.g., having a range between about 1 foot to about 1,000 feet, in a range between about 100 feet to 500 feet or even up to 1,000 feet). The long-range communication nodes may be formed into communication networks (e.g., an ultrasonic acoustic communication network) that may involve using a multiple frequency shift keying (MFSK) communication configuration. In MFSK communication configurations, reliable detection and decoding of the acoustic signal frequencies is the basis for this type of communication. As noted above, the unknown and unpredictable downhole acoustic conditions may be defined from the formation, cementation, and/or composition (e.g., gas, water and/or oil). Accordingly, it may be difficult to select the frequencies for acoustic signals to be used between the communication nodes prior to deployment within the wellbore to support a desired communication (e.g., long range communication) with minimum power consumption.

As another enhancement, the frequency ranges used for the communication network may be adjusted dynamically. In particular, the acoustic communication channel between each pair of communication nodes may be variable over a small frequency range. The frequency selectivity is a result of the coupling of acoustic signals to the tubular members from individual communication nodes, which may be influenced by the installation, but also may be influenced by conditions, such as the acoustic signal propagation path variations along the wellbore (e.g., formation, cement, casing, and/or composition of gas, water, and oil). As a further influence, the coupling and propagation of an acoustic signal may be disrupted after performing hydrocarbon operations (e.g., perforating or cementing installation operations in the wells). As a result, selecting one pre-selected set of acoustic frequencies for the entire communication system operational life is likely to be limiting.

By selecting and optimizing the acoustic frequencies in combination with adaptive coding methods between each pair of communication nodes, the present techniques provide a system and method to support reliable long range communication along tubular members, such as in the downhole environment. The frequency band selection method for communication networks may use laboratory and/or surface testing facilities and acoustic waveguide theory. Then, if needed, the individual acoustic frequencies may be further optimized after the communication nodes are deployed along the tubular members, such as once disposed into the wellbore. The acoustic signals with the highest signal strength in a broad frequency band are selected and used for communication between each pair of communication nodes, and they may be the same or different among different pairs of communication nodes in the system. After the frequencies are selected, one of several coding methods may be selected and adapted to support communication based on the selected number of acoustic frequencies. Within a specific time and/or condition changes, the set of acoustic frequencies and coding methods may be re-evaluated and updated to re-optimize system's communication reliability and speed.

Further, the acoustic communication band optimization may also include selecting a tone detection method. The tone detection method may include a fast Fourier transform (FFT), zero crossing (ZCX) and any combination thereof. The tones may be defined as decoded or detected if FFT recognizes the correct frequencies or ZCX recognizes the correct periods. The FFT and/or ZCX may be selected depending on computational power and energy efficiency of the microcontroller deployed in the communication node. For FFT, tone selection may be based on the relative magnitude of each tone. FFT may involve greater computational power, but is more able to handle background noise. For ZCX, tone selection may be based on normalized period of zero crossings of each tone. ZCX may involve less computational power, but may be vulnerable to misdetections due to background noise. Further, FFT may be supplemented by post processing curve fitting and ZCX may be implemented in a variety of different methods. Both methods may only involve a tone to be detected within a specific range rather than an exact frequency.

FIG. 1 is an exemplary schematic representation of a well 100 configured to use a communication network having a sand detection system that includes one or more communication nodes in accordance with certain aspects of the present techniques. The sand detection system may be used to provide a mechanism to monitor the presence of sand within the wellbore. The monitoring may be performed concurrently, simultaneously and/or in real-time with the performance of the hydrocarbon operations, such as cementing installation operations. The well includes a wellbore 102 that extends from surface equipment 120 to a subsurface region 128. Wellbore 102 also may be referred to herein as extending between a surface region 126 and subsurface region 128 and/or as extending within a subterranean formation 124 that extends within the subsurface region. The wellbore 102 may include a plurality of tubular sections or tubular members 110, which may be formed of carbon steel, such as a casing or liner. Subterranean formation 124 may include hydrocarbons. The well 100 may be used as a hydrocarbon well, a production well, and/or an injection well.

Well 100 also includes an acoustic wireless communication network. The acoustic wireless network also may be referred to herein as a downhole acoustic wireless network that includes various communication nodes 114, 148 and a topside communication node and/or control unit 132. The communication nodes 114, 148 may be spaced-apart along a tone transmission medium that extends along a length of wellbore 102. The communication nodes 114 may be disposed on the interior surface of the tubular members and/or the sensors may be configured to be in contact with the interior surface to monitor or measure the fluid as it passes. In the context of wellbore 102, the tone transmission medium may include a tubular member 110 that may extend within wellbore 102, a wellbore fluid that may extend within wellbore 102, sand 104 that may be present in the wellbore fluid, a portion of subsurface region 128 that is proximal wellbore 102, and/or a portion of subterranean formation 124 that is proximal wellbore 102 and/or that may extend within an annular region between wellbore 102 and tubular member 110. Downhole tubular 110 may define a fluid conduit 108.

Communication nodes 114 and 148 may include various components to manage communication and monitor the wellbore. By way of example, the communication nodes 114, 148 may include one or more encoding components 116, which may be configured to generate an acoustic tone, such as acoustic tone, and/or to induce the acoustic tone within tone transmission medium. Communication nodes 114, 148 also may include one or more decoding components 118, which may be configured to receive acoustic tone from the tone transmission medium. The communication nodes may function as both an encoding component 116 and a decoding component 118 depending upon whether the given node is transmitting an acoustic tone (e.g., functioning as the encoding component) or receiving the acoustic tone (e.g., functioning as the decoding component). The communication nodes 114 and 148 may include both encoding and decoding functionality, or structures, with these structures being selectively used depending upon whether or not the given communication node is encoding the acoustic tone or decoding the acoustic tone. In addition, the communication nodes 114 and 148 may optionally include sensing components that are used to measure, control, and monitor conditions within the respective wellbore, such as wellbore 102.

In the well, a transmission of an acoustic tone may be along a length of wellbore along a fluid within the wellbore or tubular member. As such, the transmission of the acoustic tone is substantially axial along the tubular member, and/or directed, such as by the tone transmission medium. Such a configuration may be in contrast to more conventional wireless communication methodologies, which generally may transmit a corresponding wireless signal in a plurality of directions, or even in every direction.

Wellbore 102 may include a sand monitoring system, which may include communication nodes 114 and 148 and one or more of the tubular members 110. The communication nodes 114 and 148 may include sensing components, which may be within the communication node housing or may be in contact with the communication node. The sensing components may include communication nodes 114 and 148 that are used to monitor different properties associated with the presence of sand 104 in the wellbore and/or the tubular members.

The sand monitoring system may also include communication nodes 148, which may include similar components to the communication nodes 114 and be configured to exchange data packets with the communication nodes 114 and the control unit 132. The communication nodes 148 may further include one or more sensors that are configured to measure certain properties associated with the presence of sand 104 in the wellbore and/or the tubular members 110.

The plurality of frequencies, which are used in the communication nodes 114 and 148, may include the first frequency for a first type of communication node type and/or a second frequency for a second type of communication node type. Each of the wireless network types may be used in different configurations to provide the communication for the hydrocarbon operations. The respective frequency ranges may be any suitable values. As examples, each frequency in the plurality of high-frequency ranges may be at least 20 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of high-frequency ranges may be at most 1,000 kHz (1 megahertz (MHz)), at most 800 kHz, at most 750 kHz, at most 600 kHz, at most 500 kHz, at most 400 kHz, at most 200 kHz, at most 150 kHz, at most 100 kHz, and/or at most 80 kHz. Further, each frequency in the low-frequency ranges may be at least 20 hertz (Hz), at least 50 Hz, at least 100 Hz, at least 150 Hz, at least 200 Hz, at least 500 Hz, at least 1 kHz, at least 2 kHz, at least 3 kHz, at least 4 kHz, and/or at least 5 kHz. Additionally or alternatively, each frequency in the high-frequency ranges may be at most 10 kHz, at most 12 kHz, at most 14 kHz, at most 15 kHz, at most 16 kHz, at most 17 kHz, at most 18 kHz, and/or at most 20 kHz.

Figure 2A:
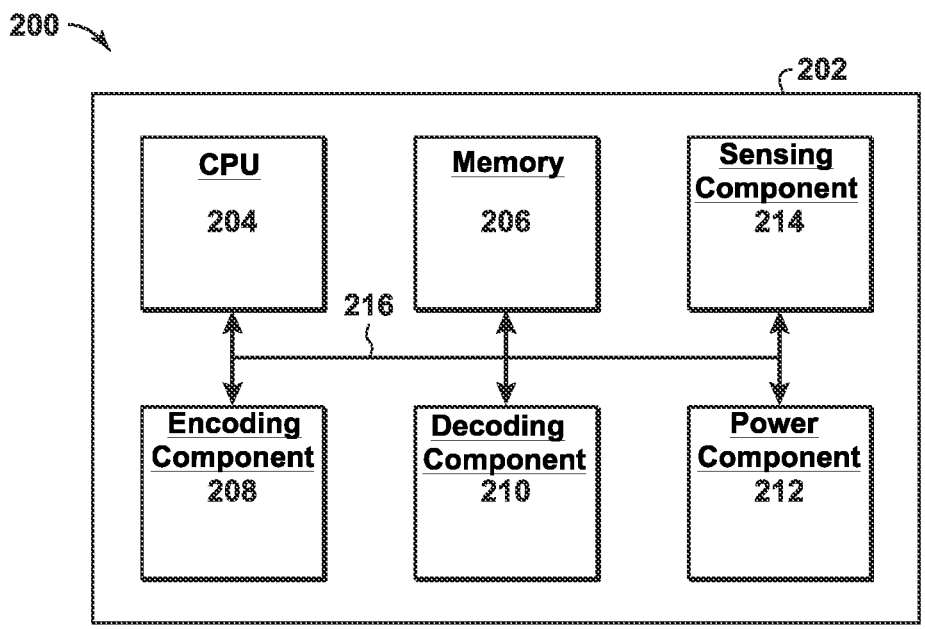
FIGS. 2A and 2B are exemplary views of communications nodes of FIG. 1.
Figure 2B:
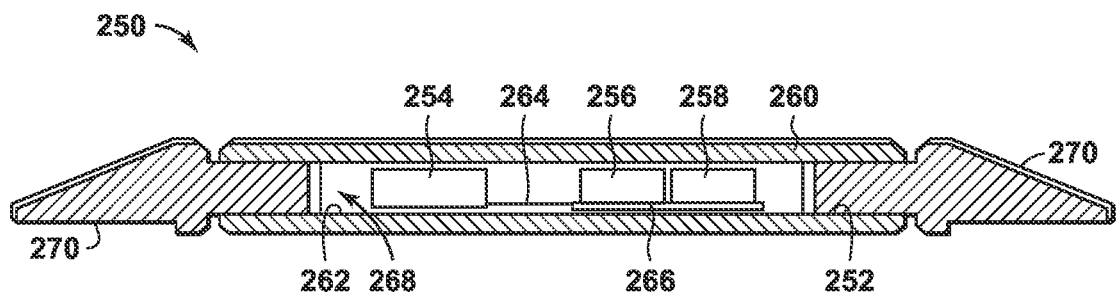

The communication nodes 114 and 148 may include various configurations, such as those described in FIGS. 2A and 2B. The communications node may be disposed on a conduit and/or a tubular section within the respective wellbore, such as wellbore 102 and may be disposed along or near a tubular member 110. The communication nodes may be associated with equipment, may be associated with tubular members and/or may be associated with the surface equipment. The communication nodes may also be configured to attach at joints, internal or external surfaces of tubular members, surfaces within the wellbore, or to equipment present in the wellbore or in one or more of the tubular members.

As a specific example, the communications nodes may be structured and arranged to attach to the surface (e.g., internal or external surface) of conduits at a selected location. This type of communication node may be disposed in a wellbore environment as a communications node (e.g., an intermediate node between the surface and any communication nodes associated with the equipment and/or sensors). The communication nodes, which are primarily used for exchanging data packets within the wellbore, may be disposed on each tubular member, or may be disposed on alternative tubular members, while other communication nodes, which are primarily used for obtaining measurements and then exchanging data packets with other communication nodes within the wellbore, may be disposed on tubular members or other wellbore equipment. By way of example, the communications node may be welded onto the respective surface or may be secured with a fastener to the tubular member (e.g., may be selectively attachable to or detachable from tubular member). The fastener may include the use of clamps (not shown), an epoxy or other suitable acoustic coupling may be used for chemical bonding. By attaching to the external surface of the tubular member, the communication nodes may lessen interfere with the flow of fluids within the internal bore of the tubular section. Further, the communication nodes may be integrated into a joint, a tubular member and/or equipment.

FIG. 2A is a diagram 200 of an exemplary communication node. The communication node 200 may include a housing 202 along with a central processing unit (CPU) 204, memory 206, which may include instructions or software to be executed by the CPU 204 one or more encoding components 208, one or more decoding components 210, a power component 212 and/or one or more sensing components 214, which communicate via a bus 216. The central processing unit (CPU) 204 may be any general-purpose CPU, although other types of architectures of CPU 204 may be used as long as CPU 204 supports the inventive operations as described herein. The CPU 204 may contain two or more microprocessors and may be a system on chip (SOC), digital signal processor (DSP), application specific integrated circuits (ASIC), and field programmable gate array (FPGA). The CPU 204 may execute the various logical instructions according to disclosed aspects and methodologies. For example, the CPU 204 may execute machine-level instructions for performing processing according to aspects and methodologies disclosed herein. The memory 206 may include random access memory (RAM), such as static RAM (SRAM), dynamic RAM (DRAM), synchronous DRAM (SDRAM), or the like, read-only memory (ROM), such as programmable ROM (PROM), erasable PROM (EPROM), electronically erasable PROM (EEPROM), or the like. In addition, the memory 206 may include NAND flash and/or NOR flash. Further, the power component 212 may be disposed in the housing 202 and may be configured to provide power to the other components. The power component 212 may include one or more batteries.

To manage the communications, the communication node 200 may use the one or more encoding components 208 and one or more decoding components 210 within the housing 202. The encoding components 208, which may include one or more transducers, may be disposed within the housing 202 and may be configured to generate an acoustic tones and/or to induce the acoustic tone on a tone transmission medium. The one or more decoding components 210, which may include one or more transducers, may be disposed within the housing 202 and may be configured to receive acoustic tones from the tone transmission medium. The encoding and decoding components 208 and 210 may include instructions stored in memory and used to perform the generation of the acoustic tones or decoding of the acoustic tones along with compression or decompression of the data packets into the acoustic tones. The encoding component 208 and decoding component 210 may use the same transducer in certain configurations.

The one and/or more sensing components 214 (e.g., sensors, which may be used to obtain properties of the fluid in the wellbore) may be configured to obtain sensing data and communicate the obtained measurement data to other communication nodes. By way of example, the sensing components 214 may be configured to obtain pressure measurements, temperature measurements, fluid flow measurements, vibration measurements, resistivity measurements, capacitance measurements, strain measurements, acoustics measurements, stimulation and/or hydraulic fracture properties measurements, chemicals measurements, position measurements and other suitable measurements. By way of example, the sensing components 214 may be configured to obtain measurements associated with the detection of changes in density, changes in gamma ray emissions, changes in temperature, changes in pressure and/or specific property to monitor the presence and location of sand in the wellbore or associated tubular members.

In yet another exemplary configuration, FIG. 2B is an exemplary cross sectional diagram of a communications node 250 that may be used in the system. The view of the communication node 250 is along the longitudinal axis. The communications node 250 includes a housing 252, which may be fabricated from carbon steel or other suitable material to avoid corrosion at the coupling. The housing 252 is dimensioned to provide sufficient structural strength to protect internal components and other electronics disposed within the interior region. By way of example, the housing 252 has an outer wall 260, which may be about 0.2 inches (0.51 centimeters (cm)) in thickness. A cavity 262 houses the electronics, including, by way of example and not of limitation, a power source 254 (e.g., one or more batteries), a power supply wire 264, a first electro-acoustic transducer 256, a second electro-acoustic transducer 258, and a circuit board 266. The circuit board 266 may preferably include a micro-processor or electronics module that processes acoustic signals.

For communication between communication nodes, the first transducer 256 and the second transducer 258, which may each be electro-acoustic transducers, are provided to convert acoustical energy to electrical energy (or vice-versa) and are coupled with outer wall 260 on the side attached to the tubular member. As an example, the first transducer 256, which may be configured to receive acoustic signals, and a second transducer 258, which may be configured to transmit acoustic signals, are disposed in the cavity 262 of the housing 252. The first and second transducers 256 and 258 provide a mechanism for acoustic signals to be transmitted and received from node-to-node, either up the wellbore or down the wellbore. In certain configurations, the second electro-acoustic transducer 258, configured to serve as a transmitter, of intermediate communications nodes 250 may also produce acoustic telemetry signals. Also, an electrical signal is delivered to the second transducer 258 via a driver circuit. By way of example, a signal generated in one of the transducers, such as the second transducer 258, passes through the housing 252 to the tubular member, and propagates along the tubular member to other communications nodes. As a result, the transducers that generates or receives acoustic signals may be a magnetostrictive transducer (e.g., including a coil wrapped around a core) and/or a piezoelectric ceramic transducer. Regardless of the specific type of transducer, the electrically encoded data are transformed into a sonic wave that is carried through the walls of a tubular member in the wellbore. In certain configurations, a single transducer may serve as both the transmitter and receiver.

Further, the internals of communications nodes 250 may include a protective layer 268. The protective layer 268 resides internal to the wall 260 and provides an additional thin layer of protection for the electronics. This protective layer provides additional mechanical durability and moisture isolation. The intermediate communications nodes 250 may also be fluid sealed with the housing 252 to protect the internal electronics. One form of protection for the internal electronics is available using a potting material.

To secure the communication node to the tubular member, the intermediate communications nodes 250 may also optionally include a shoe 270. More specifically, the intermediate communications nodes 250 may include a pair of shoes 270 disposed at opposing ends of the wall 260. Each of the shoes 270 provides a beveled face that helps prevent the node 250 from hanging up on an external tubular body or the surrounding earth formation, as the case may be, during run-in or pull-out.

To enhance the performance, the communication nodes may be configured to manage different types of wireless networks. For example, a communication node may be configured to operate with different types of networks and may use different frequencies to exchange data, such as low frequencies, high frequencies and/or radio frequencies. Accordingly, the communication nodes may be configured to communicate with each of the types of communication networks and/or may be configured to transmit with one type of communication network and receive with another type of communication network. In certain configurations, the acoustic waves may be communicated in asynchronous packets of information comprising various separate tones. In other configurations, the acoustic telemetry data transfer may involve multiple frequency shift keying (MFSK). Any extraneous noise in the signal is moderated by using well-known analog and/or digital signal processing methods. This noise removal and signal enhancement may involve conveying the acoustic signal through a signal conditioning circuit using, for example, one or more bandpass filters.

Figure 3:
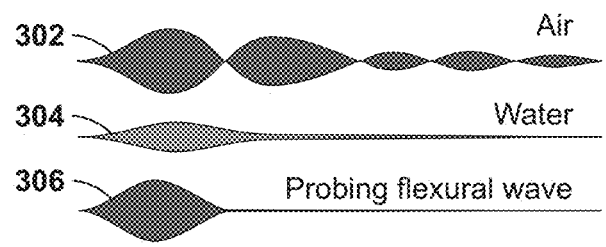
FIG. 3 is a graph showing different acoustic waveforms.

The tubular structures or members are the primary acoustic communication medium between communication nodes. The acoustic boundary conditions change depending on the material present in the tubular member. FIG. 3 shows how various materials in a tubular member attenuate a waveform propagating therethrough. The first waveform 302 shows how air in the tubular member impacts a waveform; the second waveform 304 shows the impact of water in the tubular member; and the third waveform 306, which is a probing flexural wave, shows the expected impact of sand in the tubular member. It can be seen that different materials cause an acoustic signal to attenuate and propagate differently and in uniquely different ways. The waveform change can be captured by comparing signals transmitted and received at different times. For example, a first communication node 148a may transmit an acoustic signal, which is received by a second communication node 148b. The waveform of the received signal is analyzed to determine how the contents of tubular member 110 impact the waveform. If the waveform of the received signal resembles the first waveform 302, it is concluded that no sand is present in the portion of the tubular member between the first and second communication nodes 148a, 148b. If the waveform of the received signal resembles the second waveform 304, it is concluded that the contents of the tubular member between the first and second communication nodes 148a, 148b comprise water or a similar liquid. If the waveform of the received signal resembles the third waveform 306, it is concluded that sand is present in the tubular member between the first and second communication nodes 148a, 148b. Furthermore, analyzing the waveforms of received signals between the first and second communication nodes over time may provide a more accurate predictor of how much sand is present in the tubular member, and not merely the presence of sand therein. Furthermore, by comparing the waveforms of signals from all communication nodes over time, the sand deposition/settling levels and rates may be calculated. A sand clean-up process can be scheduled accordingly.

Figure 4:
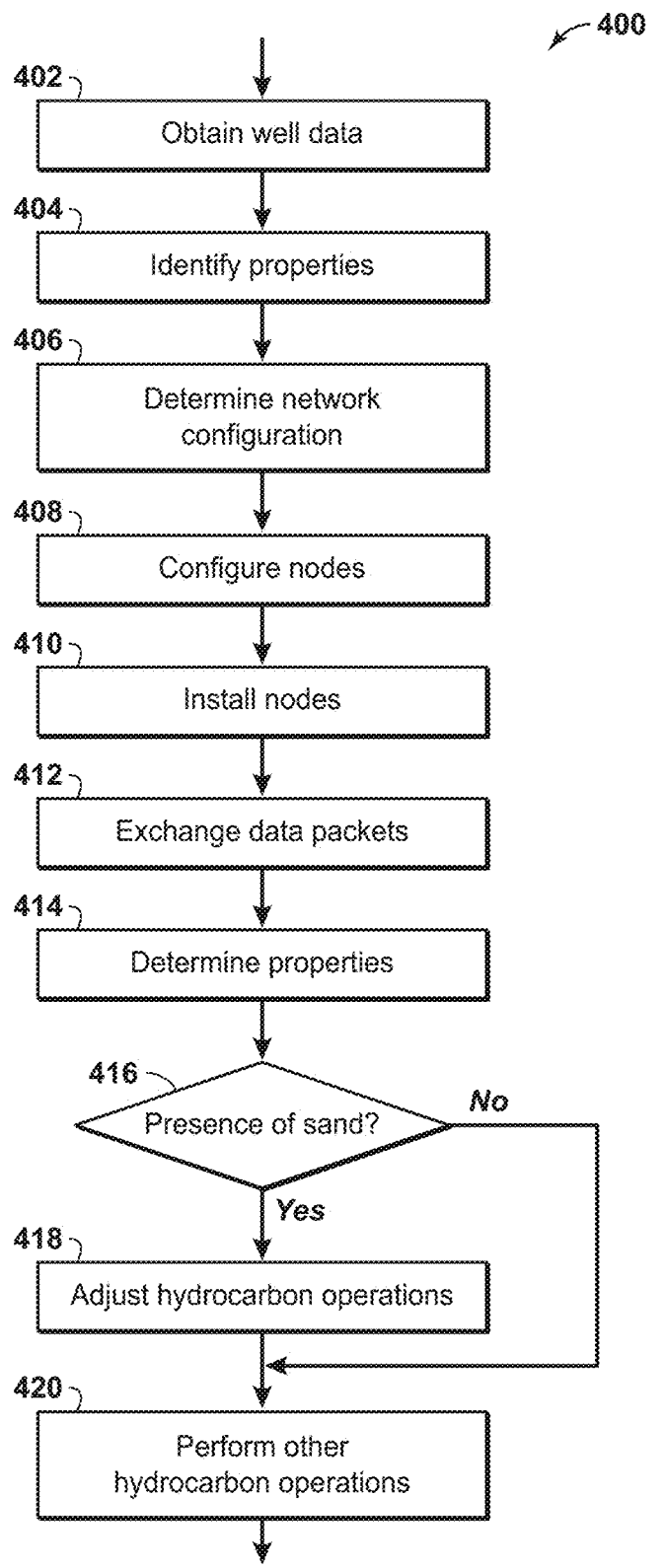
FIG. 4 is an exemplary flow chart in accordance with an embodiment of the present techniques.

FIG. 4 is an exemplary flow chart 400 in accordance with an embodiment of the present techniques. The flow chart 400 is a method for creating, installing and using a communication network in a wellbore associated with hydrocarbon operations, which include detecting sand in the wellbore or associated tubular members. The method may include creating a communication network and installing the communication network in a wellbore along with a sand detection system, as shown in blocks 402 to 410. Then, the communication network may be monitored and hydrocarbon operations are performed, as shown in blocks 412 to 420.

To begin, the method involves creating, installing and using a wireless network for a wellbore along with a sand detection system, as shown in blocks 402 to 410. At block 402, well data for a subsurface region is obtained. The well data may include seismic data, electromagnetic data, resistivity data, gravity data, well log data, core sample data, and combinations thereof. The well data may be obtained from memory or from the equipment in the wellbore. The well data may also include the data associated with the equipment installed within the wellbore and the configuration of the wellbore equipment and/or hardware capabilities. For example, the well data may include the composition of the tubular members, thickness of the tubular members, length of the tubular members, fluid composition within the wellbore, formation properties, cementation within the wellbore and/or other suitable properties associated with the wellbore. At block 404, properties and/or potential locations for sand are identified. The potential locations for sand may be identified based on predetermined locations near a subsurface region, which is determined to have a possibility for sand to be present in the wellbore. The properties may be identified because they may be used to monitor fluids in the wellbore, such as production fluid or hydrocarbons. The one or more properties may include density, temperature, gamma ray, flow meter, resistivity, capacitance, stress, strain, vibration and any combination thereof.

Then, at block 406, a communication network configuration is determined based on the obtained well data. The determining the communication network configuration may include determining locations for sensing properties, spacing of communication nodes, and one or more communication configuration settings. The creation of the communication network may include selecting acoustic frequency bands and individual frequencies; optimizing the acoustic communication band for each pair of communication nodes; determining the coding method for the network and/or determining selective modes for the network. Further, the communication network may be configured to manage different wireless network types. For example, a communication node may be configured to operate with different wireless network types, such as low frequency, high frequency and/or radio frequency. The creation of the communication network may include performing a simulation with a configuration of communication nodes, which may include modeling specific frequencies and/or use of certain wireless communication node types within specific zones or segments of the wellbore. The simulation may include modeling the tubular members, the communication of signals between communication nodes, the sensor locations and associated data and/or other aspects. The simulation results may include the computation of time-varying fluid pressure and fluid compositions and the prediction of signal travel times within the wellbore. Performing the simulation may also include modeling fluid, modeling signal transmissions and/or structural changes based on the network. In addition, the creation of the wireless network may include installing and configuring the communication nodes in the wireless network in a testing unit, which may include one or more tubular members and the associated communication nodes distributed along the tubular members within a housing or support structure (e.g., a testing unit disposed above and/or external to the wellbore). The testing unit may also contain a fluid disposed around the tubular member within the housing. The modeling may include theoretical work based on acoustic waveguide theory and/or a scale above grade lab system tests. Further, the modeling and/or historical experience may provide an estimate for the frequency ranges including the preferred tonal frequency separation. The tonal frequencies may not have to be equally spaced. The frequency range bandwidth may be constrained by both the acoustics of the channel and the capability of the transmission and reception electronics, including transmit and receive transducers. Likewise, the frequency spacing of the MFSK tones may be constrained by the tonal purity of the transmitted tone and resolution of the receiver decoder.

Then, the communication nodes are configured based on the communication network configuration, as shown in block 408. The configuration of the communication nodes may include programming or storing instructions into the respective communication nodes and any associated sensors to monitor operations, such as sand detection, and exchange data packets associated with the operations near potential or actual locations for sand. At block 410, the communication nodes are installed into the wellbore based on the communication network configuration. The installation of the communication nodes in the network may include disposing the communication nodes within the wellbore, which may be secured to tubular members and/or equipment. The installation of the communication network, which may include one or more wireless networks, may include verification of the communication network by performing testing, may include distribution of the sensors and/or verification of the communication nodes in the proposed network configuration.

Then, the communication network may be monitored and hydrocarbon operations are performed, as shown in blocks 412 to 420. At block 412, the data packets are exchanged during hydrocarbon production operations. The exchange of data packets may involve the transmission of commands for equipment and/or measurement data and the associated reception of the transmissions. Hydrocarbon production operations may include activities during preparation of the communication nodes prior to installation into the wellbore, activities while the equipment is being run into the wellbore, and/or subsequent hydrocarbon production activities. At block 414, one or more properties are determined for sand detection operations. The determination of one or more properties may include computing comparisons of the measurement data, or the waveform of received acoustic signals, obtained from one or more sensors or communication nodes. These computations may be associated with the acoustic property or properties of the fluid adjacent the communication nodes. At block 416, a determination is made whether sand is present adjacent the communication nodes. The determination may include determining, by the communication node, the location and/or properties associated with the different fluids being passed through the wellbore. The determination may include transmitting a notification to indicate that sand is present or that an adjustment is needed or that a specific fluid is adjacent to the communication node. The communication nodes may be configured be configured to monitor the materials (e.g., fluids or sand) within the tubular member, and/or materials (e.g., fluids or sand) outside the tubular member. If sand is present in the wellbore, hydrocarbon production activities may be adjusted, as shown in block 418. Adjusting the hydrocarbon production activities may include sand clean-up operations, adjusting the fluid being pumped down the wellbore, adjusting the frequencies of the signals being transmitted, adjusting the properties that the communication node is monitoring, adjusting the pressure and/or flow rate of the fluid being pumped into the wellbore. For example, as the volume inside the tubular member is known, the detection of a fluid passing the communication node may change or may be adjusted. At block 420, other hydrocarbon operations may be performed. The hydrocarbon operations may involve using the wellbore to recover hydrocarbons from the subsurface region. The hydrocarbon operations may include hydrocarbon exploration operations, hydrocarbon development operations, collection of wellbore data, and/or hydrocarbon production operations. For example, the communication network may be used to enhance the composition of the fluids being produced from the well. As another example, the communication network may be used to adjust hydrocarbon production operations, such as installing or modifying equipment for a completion associated with the cementing installation, which may be based on the produced fluids. Further, the communication network may be used to predict hydrocarbon accumulation within the subsurface region based on the monitored produced fluids; to provide an estimated recovery factor; and/or to determine rates of fluid flow for a subsurface region. The production facility may include one or more units to process and manage the flow of production fluids, such as hydrocarbons and/or water, from the formation.

Beneficially, the method provides an enhancement in the production, development, and/or exploration of hydrocarbons. In particular, the method may be used to enhance communication within the wellbore by providing a specific configuration that optimizes communication for sand detection operations. Further, as the communication is provided in real time, simultaneously or concurrently with sand detection operations, the communication network may provide enhancements to production at lower costs and lower risk. As a result, the present techniques increase safety and efficiency of hydrocarbons production due to monitoring the presence and location of sand in real time.

As may be appreciated, the blocks of FIG. 4 may be omitted, repeated, performed in a different order, or augmented with additional steps not shown. Some steps may be performed sequentially, while others may be executed simultaneously or concurrently in parallel.

By way of example, the communication network may be adjusted or modified while the data packets are exchanged by performing various steps. For example, the method may include performing adjustments or modification of the selected acoustic frequency bands and individual frequencies. The acoustic frequency band and individual frequencies may include each frequency in the plurality of high-frequency ranges, which may be at least 20 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of high-frequency ranges may be at most 1,000 kHz (1 megahertz (MHz)), at most 800 kHz, at most 750 kHz, at most 600 kHz, at most 500 kHz, at most 400 kHz, at most 200 kHz, at most 150 kHz, at most 100 kHz, and/or at most 80 kHz. Further, each frequency in the low-frequency ranges may be at least 20 hertz (Hz), at least 50 Hz, at least 100 Hz, at least 150 Hz, at least 200 Hz, at least 500 Hz, at least 1 kHz, at least 2 kHz, at least 3 kHz, at least 4 kHz, and/or at least 5 kHz. Additionally or alternatively, each frequency in the high-frequency ranges may be at most 10 kHz, at most 12 kHz, at most 14 kHz, at most 15 kHz, at most 16 kHz, at most 17 kHz, at most 18 kHz, and/or at most 20 kHz. Further, the acoustic communication bands and individual frequencies for each pair of communication nodes may be optimized, which may include determining the explicit MFSK frequencies. Also, the coding methods for the communication network may be determined. In addition, the clock ticks may be optimized to maximize data communication rate. For example, the coding method may be selected based on availability of frequency bands and/or communication rates may be compromised if the frequency band is limited. In certain configurations, the coding method may include performing frequency combining based on one or more clock ticks per tone (e.g., one clock tick per tone, two clock ticks per tone, three clock ticks per tone, and/or more clock ticks per tone) to achieve more or fewer tones within a frequency band.

Further, as communication nodes may be configured with a setting or profile, the settings may include various parameters. The settings may include acoustic frequency band and individual frequencies (e.g., acoustic communication band and individual frequencies for each pair of communication nodes); and/or coding methods (e.g., establishing how many tones to use for MFSK (2, 4, 8, . . . ) and/or whether to use direct mapping or spread spectrum), and/or tone detection method, such as FFT, ZCR and other methods. The settings may include frequency combining using one or more clock ticks per tone. The tones may be selected to compensate for poor acoustic propagation.

Persons skilled in the technical field will readily recognize that in practical applications of the disclosed methodology, it is partially performed on a computer, typically a suitably programmed digital computer or processor based device. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions using the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein, such as monitoring and communicating. This apparatus, such as the control unit or the communication nodes, may be specially constructed for the required purposes, or it may comprise a general-purpose computer or processor based device selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), NAND flash, NOR flash, magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming Additionally, the present techniques are in no way limited to implementation in any specific operating system or environment.

By way of example, the control unit may include a computer system that may be used to perform any of the methods disclosed herein. A central processing unit (CPU) is coupled to system bus. The CPU may be any general-purpose CPU, although other types of architectures of CPU (or other components of exemplary system) may be used as long as CPU (and other components of system) supports the inventive operations as described herein. The CPU may contain two or more microprocessors and may be a system on chip (SOC), digital signal processor (DSP), application specific integrated circuits (ASIC), and field programmable gate array (FPGA). The CPU may execute the various logical instructions according to disclosed aspects and methodologies. For example, the CPU may execute machine-level instructions for performing processing according to aspects and methodologies disclosed herein.

The computer system may also include computer components such as a random access memory (RAM), which may be SRAM, DRAM, SDRAM, or the like. The computer system may also include read-only memory (ROM), which may be PROM, EPROM, EEPROM, or the like. RAM and ROM, which may also include NAND flash and/or NOR flash, hold user and system data and programs, as is known in the art. The computer system may also include an input/output (I/O) adapter, a graphical processing unit (GPU), a communications adapter, a user interface adapter, and a display adapter. The I/O adapter, the user interface adapter, and/or communications adapter may, in certain aspects and techniques, enable a user to interact with computer system to input information.

The I/O adapter preferably connects a storage device(s), such as one or more of hard drive, compact disc (CD) drive, floppy disk drive, tape drive, etc. to computer system. The storage device(s) may be used when RAM is insufficient for the memory requirements associated with storing data for operations of embodiments of the present techniques. The data storage of the computer system may be used for storing information and/or other data used or generated as disclosed herein. The communications adapter may couple the computer system to a network (not shown), which may include the network for the wellbore and a separate network to communicate with remote locations), which may enable information to be input to and/or output from system via the network (for example, a wide-area network, a local-area network, a wireless network, any combination of the foregoing). User interface adapter couples user input devices, such as a keyboard, a pointing device, and the like, to computer system. The display adapter is driven by the CPU to control, through a display driver, the display on a display device.

The architecture of system may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to: perform certain operations.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method of detecting sand in a wellbore, comprising:
obtaining well data for a subsurface region, wherein the well data comprises one or more of seismic data, electromagnetic data, resistivity data, gravity data, well log data, core sample data, and any combination thereof, and wherein the well data further comprises equipment data associated with tubular members installed within the wellbore;
determining one or more potential locations for sand within the wellbore based on the obtained well data;
determining a communication network based on the one or more potential locations for sand and the obtained well data, wherein the communication network includes a plurality of communication nodes comprising sensors, and wherein sensors within communication nodes of the plurality of communication nodes installed within a vicinity of the one or more potential locations for sand are arranged in a denser configuration as opposed to sensors within communication nodes of the plurality of communication nodes installed in other locations within the wellbore;
installing the plurality of communication nodes into the wellbore, wherein one or more communication nodes of the plurality of communication nodes are configured to obtain measurement data associated with fluids within the wellbore and to transmit the measurement data to other communication nodes in the communication network;

performing sand detection operations in the wellbore, wherein the performing of the sand detection operations includes:

transmitting a signal from a first of the plurality of communication nodes;

receiving the signal by a second of the plurality of communication nodes, transmitting data packets associated with the received signal to a control unit via the communication network;

after transmitting the data packets, analyzing a waveform of the received signal to determine whether sand is present in the wellbore from a first property related to sand detection; and performing hydrocarbon operations in the wellbore.

2. The method of claim 1, further comprising adjusting hydrocarbon operations based on the transmitted data packets associated with the received signal.

3. The method of claim 1, further comprising:
analyzing the received signal to determine an amount of sand present in the wellbore; and
transmitting data packets associated with the received signal to the control unit via the communication network.

4. The method of claim 1, further comprising determining changes in an amount of sand adjacent the one or more communication nodes during the sand detection operations.

5. The method of claim 1, further comprising configuring the plurality of the communication nodes based on a communication network configuration.

6. The method of claim 5, wherein the communication network configuration comprises selecting one of one or more frequency bands, one or more individual tones, one or more coding methods, and any combination thereof.

7. The method of claim 1, further comprising producing hydrocarbons from the wellbore.

8. The method of claim 1, wherein the transmitting data packets comprises transmitting high-frequency signals that are greater than (>) 20 kilohertz.

9. The method of claim 1, wherein the transmitting data packets comprises transmitting high-frequency signals that are in a range between greater (>) than 20 kilohertz and 1 megahertz.

10. The method of claim 1, wherein the signal transmitted by the first of the plurality of communication nodes and received by the second of the plurality of communication nodes is an acoustic signal.

11. A hydrocarbon system comprising:
a wellbore in the hydrocarbon system, for which well data is available, wherein the well data comprises one or more of seismic data, electromagnetic data, resistivity data, gravity data, well log data, core sample data, and any combination thereof, and wherein the well data further comprises equipment data associated with a plurality of tubular members disposed in the wellbore, and wherein one or more potential locations for sand within the wellbore are determined based on the well data;

the plurality of tubular members disposed in the wellbore;

a communication network associated with the hydrocarbon system, wherein the communication network comprises a plurality of communication nodes that are configured to communicate between two or more of the plurality of communication nodes during operations, wherein the communication nodes comprises sensors, wherein the communication network is determined based on the one or more potential locations for sand and the well data, and wherein sensors within communication nodes of the plurality of communication nodes installed within a vicinity of the one or more potential locations for sand are arranged in a denser configuration as opposed to sensors within communication nodes of the plurality of communication nodes installed in other locations within the wellbore; and a sand detection system, wherein one or more communication nodes of the plurality of communication nodes are configured to receive acoustic signals sent from others of the plurality of communication nodes, and wherein the acoustic signals are transmitted via data packets to a control unit via the communications network and, thereafter, waveforms of the transmitted acoustic signals are analyzed to determine whether sand is present in the wellbore.

12. The hydrocarbon system of claim 11, wherein the plurality of communication nodes are configured to transmit high-frequency signals that are greater than (>) 20 kilohertz.

13. The hydrocarbon system of claim 12, wherein the plurality of communication nodes are configured to transmit high-frequency signals that are in a range between greater than (>) 20 kilohertz and 1 megahertz.

14. The method recited in claim 1, wherein the measurement data is obtained from a sensor mounted on a sand screen.

15. The hydrocarbon system recited in claim 12, wherein the sand detection system comprises a sensor mounted on a sand screen.

* * * * *